United States Patent
Mo et al.

(10) Patent No.: US 12,131,445 B2
(45) Date of Patent: Oct. 29, 2024

(54) METHOD FOR ENHANCING OBJECT CONTOUR OF IMAGE IN REAL-TIME VIDEO

(71) Applicant: HUNAN VATHIN MEDICAL INSTRUMENT CO., LTD., Xiangtan (CN)

(72) Inventors: Wenjun Mo, Xiangtan (CN); Chunmei Gou, Xiangtan (CN)

(73) Assignee: HUNAN VATHIN MEDICAL INSTRUMENT CO., LTD., Xiangtan (CN)

(*) Notice: Subject to any disclaimer, the term of this patent is extended or adjusted under 35 U.S.C. 154(b) by 151 days.

(21) Appl. No.: 17/608,991

(22) PCT Filed: Apr. 29, 2020

(86) PCT No.: PCT/CN2020/087871
§ 371 (c)(1),
(2) Date: Jul. 26, 2022

(87) PCT Pub. No.: WO2020/224508
PCT Pub. Date: Nov. 12, 2020

(65) Prior Publication Data
US 2023/0401675 A1 Dec. 14, 2023

(30) Foreign Application Priority Data
May 5, 2019 (CN) .......................... 201910368593.X

(51) Int. Cl.
*G06T 5/00* (2024.01)
*G06T 5/70* (2024.01)
*G06T 5/90* (2024.01)

(52) U.S. Cl.
CPC .................. *G06T 5/70* (2024.01); *G06T 5/90* (2024.01); *G06T 2207/20021* (2013.01); *G06T 2207/20024* (2013.01); *G06T 2207/20192* (2013.01)

(58) Field of Classification Search
CPC ... G06T 5/70; G06T 5/90; G06T 2207/20021; G06T 2207/20024; G06T 2207/20192
See application file for complete search history.

(56) References Cited

U.S. PATENT DOCUMENTS

| 6,059,729 A | 5/2000 | Stonger |
| 2003/0053161 A1* | 3/2003 | Li ............................. G06T 5/70 358/1.9 |

(Continued)

FOREIGN PATENT DOCUMENTS

| CN | 104574284 A | 4/2015 |
| CN | 106920218 A | 7/2017 |

(Continued)

*Primary Examiner* — David F Dunphy
(74) *Attorney, Agent, or Firm* — Bayramoglu Law Offices LLC

(57) ABSTRACT

A method for enhancing the contour of an object in a real-time video image includes: acquiring a captured video, and dividing a next frame of image in the video into a plurality of image blocks; subjecting each pixel in each of the image blocks to contour enhancement based on a gradient algorithm; subjecting the plurality of contour-enhanced image blocks as a whole to noise filtering by using a Gaussian filtering method to obtain a noise-filtered image; and subjecting the entire noise-filtered image to contrast processing based on gamma transformation to obtain a final enhanced image. The method is used for image contour enhancement, and solves the problem that it is hard to recognize an object with low recognizability in an image (i.e., original image) output by a device in the prior art.

7 Claims, 1 Drawing Sheet

(56) References Cited

U.S. PATENT DOCUMENTS

| | | | |
|---|---|---|---|
| 2003/0132946 A1 | 7/2003 | Gold | |
| 2006/0072844 A1 | 4/2006 | Wang et al. | |
| 2007/0177817 A1* | 8/2007 | Szeliski | G06T 5/70 |
| | | | 382/162 |
| 2017/0039688 A1* | 2/2017 | Hirayama | G06T 5/94 |

FOREIGN PATENT DOCUMENTS

| | | |
|---|---|---|
| CN | 108898152 A | 11/2018 |
| CN | 110335203 A | 10/2019 |
| JP | 5557635 B2 | 7/2014 |

\* cited by examiner

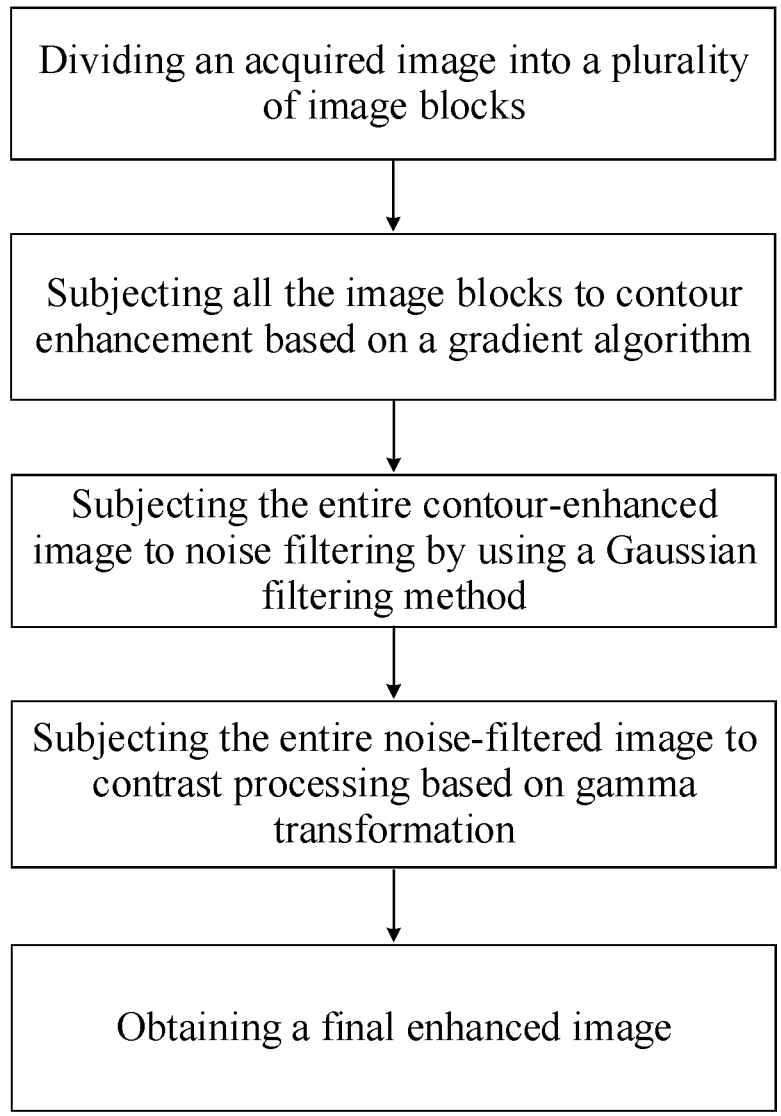

METHOD FOR ENHANCING OBJECT CONTOUR OF IMAGE IN REAL-TIME VIDEO

CROSS REFERENCE TO THE RELATED APPLICATIONS

This application is the national phase entry of International Application No. PCT/CN2020/087871, filed on Apr. 29, 2020, which is based upon and claims priority to Chinese Patent Application No. 201910368593.X, filed on May 5, 2019, the entire contents of which are incorporated herein by reference.

TECHNICAL FIELD

The present invention belongs to the technical field of real-time video image processing, and more particularly, relates to a method for enhancing a contour of an object in an image.

BACKGROUND

Medical imaging relies on the interaction of certain media (such as X-rays, electromagnetic fields and ultrasound) with the human body to visualize, that is, to present the structure and density of the internal tissues and organs of the human body in the form of images for doctors. Medical imaging involves two independent research directions, namely, medical imaging systems and medical image processing.

Medical imaging systems mainly include X-ray imaging equipment, computed tomography (CT) (ordinary CT and spiral CT), positron emission tomography (PET), ultrasound (B-mode, color Doppler, cardiac Doppler, three-dimensional (3D) color Doppler), magnetic resonance imaging (MRI), electrocardiograph (ECG), electroencephalogram (EEG), etc.

The X-ray imaging equipment, CT, ultrasound and MRI display black and white images. Due to optical reasons, except for some special places, the vascular tissues in the images cannot be recognized. The prior art only performs pure contour extraction on the image, ignoring the details of the image.

Therefore, the images displayed by the medical imaging equipment in the prior art are original images without contour enhancement and extraction, resulting in that it is hard to recognize objects with low recognizability.

SUMMARY

In order to solve the problem that it is hard to recognize an object with low recognizability in an image (i.e., original image) output by a device in the prior art, an objective of the present invention is to provide a method for enhancing a contour of an object in a real-time video image.

A technical solution adopted by the present invention is as follows:

A method for enhancing a contour of an object in a real-time video image includes the following steps:

S1: acquiring a captured video, and dividing a next frame of image in the video into a plurality of image blocks;

S2: subjecting each pixel in each of the image blocks to contour enhancement based on a gradient algorithm;

S3: subjecting the plurality of contour-enhanced image blocks as a whole to noise filtering by using a Gaussian filtering method to obtain a noise-filtered image; and S4: subjecting the entire noise-filtered image to contrast processing based on gamma transformation to obtain a final enhanced image.

Further, step S1 may include: dividing the next frame of image in the video into the plurality of image blocks based on a scheme of 8×8, 16×16 or 32×32.

Further, step S2 may include:

S2.1: performing gradient calculation on a brightness component of each pixel of each of the image blocks based on an improved gradient calculation formula to obtain a gradient value of each pixel; and S2.2: determining whether each gradient value is greater than a set threshold; if yes, determining that the pixel is at an edge, and determining whether to set the pixel at a white edge or a black edge according to a negative of the gradient value; and if not, not processing.

Further, in step S2.1, the improved gradient calculation formula may be:

$$I = \Sigma_i \Sigma_j ((Y1-Y2)/(Y1+Y2))$$

where, Y1, Y2 are brightness of two adjacent pixels; i and j are an abscissa and an ordinate of a pixel, respectively; and I is a calculated gradient value.

Further, step S3 may include:

S3.1: classifying the plurality of contour-enhanced image blocks as a whole according to brightness of the plurality of contour-enhanced image blocks; and S3.2: if a gain value of an entire image meets a brightness requirement after classification, filtering the entire image based on a Gaussian filtering formula; and if not, not filtering.

Further, step 3.1 may include: subjecting the plurality of contour-enhanced image blocks to a weighted average, calculating a brightness value of the entire image, and classifying the entire contour-enhanced image according to a brightness indicated by the brightness value, that is, classifying the entire contour-enhanced image into four levels according to a gain value, namely, a level corresponding to a gain value less than ISO100, a level corresponding to a gain value of ISO200, a level corresponding to a gain value of ISO400 and a level corresponding to a gain value of ISO800.

Further, step 3.2 may include: not filtering when the gain value is less than ISO100; setting a standard deviation to 16 and filtering based on the Gaussian filtering formula when the gain value is ISO200; setting the standard deviation to 20 and filtering based on the Gaussian filtering formula when the gain value is ISO400; and setting the standard deviation to 25 and filtering based on the Gaussian filtering formula when the gain value is ISO800;

where, the Gaussian filtering formula may be:

$$G(Y) = \sum_i \sum_j \frac{1}{\sqrt{2\pi}\,\sigma} e^{-\frac{Y(i,j)^2}{2\sigma^2}},$$

where, σ represents the standard deviation; Y represents a brightness of a current pixel; and i and j are an abscissa and an ordinate of the pixel, respectively.

Further, in step S4, a formula for the gamma transformation may be:

$$T(Y) = \Sigma_i \Sigma_j (1+Y)^\gamma,$$

where, Y represents a brightness of a current pixel; γ represents a γ coefficient; and i and j are an abscissa and an ordinate of the pixel, respectively.

A parameter value γ for global observation of the image and a parameter value γ for detail observation of the image are set based on the formula for the gamma transformation, and the entire noise-filtered image is respectively subjected to contrast processing through the two parameter values γ to obtain the final enhanced image T(Y).

The present invention has the following beneficial effects:

1. The present invention combines the gradient algorithm, the Gaussian filtering method and the gamma transformation to enhance the contour of the object in the image, which maximizes the recognizability of the object in the image, facilitating the recognition of a micro-object.

2. The gradient of the existing gradient algorithm is a partial derivative of a continuous function on the surface. The present invention modifies the existing gradient algorithm. In the present invention, each pixel in the image is a discrete function, which facilitates the contour enhancement of a plurality of image blocks.

3. The present invention performs hierarchical filtering according to the brightness of the entire image, which solves the problem of poor image sharpness and smoothness caused by Gaussian filtering directly based on the same brightness in the prior art.

4. In the present invention, by setting two parameter values γ, an enhanced image for global observation and an enhanced image for detail observation can be obtained, which are suitable for different situations.

BRIEF DESCRIPTION OF THE DRAWINGS

To describe the technical solutions in examples of the present invention or in the prior art more clearly, the drawings required for describing the examples or the prior art will be briefly described below. Apparently, the drawings in the following description show some examples of the present invention, and a person of ordinary skill in the art may still derive other drawings from these drawings without creative efforts.

FIGURE is a flowchart of the present invention.

DETAILED DESCRIPTION OF THE EMBODIMENTS

The embodiments of the present invention are described below in detail. Numerals of the embodiments are shown in the drawings. The same or similar numerals represent the same or similar elements or elements having the same or similar functions throughout the specification. The embodiments described below with reference to the drawings are illustrative, which are merely intended to explain the present invention, rather than to limit the present invention.

It should be understood that in the description of the present invention, terms such as "first" and "second" are used merely for a descriptive purpose, and should not be construed as indicating or implying relative importance, or implicitly indicating the number of indicated technical features. Thus, features defined with "first" and "second" may explicitly or implicitly include one or more of the features. In the description of the present invention, "a plurality of" means two or more, unless otherwise specifically defined.

In the present invention, unless otherwise clearly specified and limited, the terms "installed", "connected with", "connected to", and "fixed" should be understood in a board sense. For example, the connection may be a fixed connection, a detachable connection or an integrated connection, may be a mechanical connection or an electrical connection, may be a direct connection or an indirect connection with use of an intermediate medium, or may be intercommunication between two components. Those of ordinary skill in the art may understand specific meanings of the above terms in the present invention based on a specific situation.

Structures or devices or steps not specifically described herein are those that can be implemented in the prior art.

A method for enhancing a contour of an object in an image includes the following steps:

S1: Acquire a captured video, and divide a next frame of image in the video into a plurality of image blocks, that is, to divide the next frame of image in the video into the plurality of image blocks based on a scheme of 8×8, 16×16 or 32×32. Of course, the image may also be divided by using other schemes, but the schemes selected here have a faster processing speed.

S2: Subject each pixel in each of the image blocks to contour enhancement based on a gradient algorithm.

S2.1: Perform gradient calculation on a brightness component of each pixel of each of the image blocks based on an improved gradient calculation formula to obtain a gradient value of each pixel.

The gradient in the gradient algorithm in the prior art is a partial derivative of a continuous function on a surface. In the present invention, each pixel of the image is a discrete function. In the gradient calculation needs specific pixels, so the gradient algorithm in the prior art needs to be improved. The improved gradient calculation formula is:

$$I=\Sigma_i\Sigma_j((Y1-Y2)/(Y1+Y2))$$

where, Y1, Y2 are brightness of two adjacent pixels; i and j are an abscissa and an ordinate of a pixel, respectively; and I is a calculated gradient value.

S2.2: Determine whether each gradient value is greater than a set threshold; if yes, determine that the pixel is at an edge, and determine whether to set the pixel at a white edge or a black edge according to a negative of the gradient value; and if not, not process.

S3: Subject the plurality of contour-enhanced image blocks as a whole to noise filtering by using a Gaussian filtering method to obtain a noise-filtered image, so as to increase the smoothness of the image.

Due to sensor sampling, gain and other factors will inevitably introduce noise, or own electronic noise. According to the manifestation of noise, there are salt and pepper noise, white noise, Gaussian noise, etc., which will reduce the sharpness and smoothness of the image. Therefore, it is necessary to filter the image, but if the filtering is directly based on the same brightness, the sharpness and smoothness of the image will also be reduced.

In order to solve the above problem, the step of subjecting the plurality of contour-enhanced image blocks as the whole to noise filtering by using a Gaussian filtering method to obtain a noise-filtered image specifically includes:

S3.1: Subject the plurality of contour-enhanced image blocks to a weighted average, calculate a brightness value of the entire image, and classify the entire contour-enhanced image according to a brightness indicated by the brightness value, that is, to classify the entire contour-enhanced image into four levels according to a gain value, namely, a level corresponding to a gain value less than ISO100, a level corresponding to a gain value of ISO200, a level corresponding to a gain value of ISO400 and a level corresponding to a gain value of ISO800.

S3.2: If the gain value of the plurality of image blocks (i.e. entire image) meets a brightness requirement after classification, filter the entire image based on a Gaussian filtering formula, that is, not filter when the gain value is less than ISO100; set a standard deviation to 16 and filter based on the Gaussian filtering formula when the gain value is ISO200; set the standard deviation to 20 and filter based on the Gaussian filtering formula when the gain value is ISO400; and set the standard deviation to 25 and filter based on the Gaussian filtering formula when the gain value is ISO800.

The Gaussian filtering formula is:

$$G(Y) = \sum_i \sum_j \frac{1}{\sqrt{2\pi}\sigma} e^{-\frac{Y(i,j)^2}{2\sigma^2}}$$

where, $\sigma$ represents the standard deviation; Y represents a brightness of a current pixel; and i and j are an abscissa and an ordinate of the pixel, respectively.

S4: Subject the entire noise-filtered image to contrast processing based on a formula for the gamma transformation to obtain a final enhanced image:

$$T(Y) = \sum_i \sum_j (1+Y)^\gamma$$

where, Y represents a brightness of a current pixel; $\gamma$ represents a $\gamma$ coefficient; and i and j are an abscissa and an ordinate of the pixel, respectively.

When different parameters $\gamma$ are used, the enhanced images have different effects suitable for different applications. A larger gamma parameter can be used to offer a larger range of brightness, which is suitable for observing the image globally. A smaller gamma parameter can be used to focus on a detail in a limited brightness range, which is suitable for observing the image in detail. Therefore, based on the formula for the gamma transformation, a parameter value $\gamma$ is set for global observation of the image and a parameter value $\gamma$ is set for detail observation of the image, and through the two parameter values $\gamma$, the entire noise-filtered image is subjected to contrast processing to obtain the final enhanced image T(Y).

Embodiment

In practical applications, video images need to be processed and displayed in real-time. When a current image is displayed, a next frame of image needs to be processed. Based on a scheme of 32×32, a next frame of image (1,920×1,080 pixels) is divided into a plurality of image blocks of 60×33.75 pixels. Since there is a decimal point, the image blocks are divided by rounding. That is, the next frame of image is divided by taking 60×34 pixels as an image block. Specifically, the next frame of image (1,920×1,080 pixels) is divided into 1,920×1,054 and 1,920×26 based on 32×31 and 32×26 respectively to obtain final image blocks.

A gradient calculation is performed on a brightness component of each pixel of each of the image blocks based on an improved gradient calculation formula I=$\Sigma_i\Sigma_j$((Y1−Y2)/(Y1+Y2)) to obtain a gradient value of each pixel.

It is determined whether each gradient value is greater than a set threshold. If yes, it is determined that the pixel is at an edge, and it is determined whether to set the pixel at a white edge or a black edge according to a negative of the gradient value. If not, no processing is performed.

The plurality of contour-enhanced image blocks as a whole are classified according to a brightness indicated by the brightness value of the plurality of contour-enhanced image blocks. That is, the entire image is classified into four levels according to a gain value, namely, a level corresponding to a gain value less than ISO100, a level corresponding to a gain value of ISO200, a level corresponding to a gain value of ISO400 and a level corresponding to a gain value of ISO800.

If a gain value of the entire image after classification meets a brightness requirement, the entire image is filtered based on a Gaussian filtering formula $$G(Y) = \sum_i \sum_j \frac{1}{\sqrt{2\pi}\sigma} e^{-\frac{Y(i,j)^2}{2\sigma^2}}.$$

If not, no filtering is performed. That is, when the gain value is less than ISO100, the image is not filtered. When the gain value is ISO200, a standard deviation is set to 16 and the image is filtered based on the Gaussian filtering formula. When the gain value is ISO400, the standard deviation is set to 20 and the image is filtered based on the Gaussian filtering formula. When the gain value is ISO800, the standard deviation is set to 25 and the image is filtered based on the Gaussian filtering formula.

Based on a formula for the gamma transformation T(Y)=$\Sigma_i\Sigma_j$(1+Y)$^\gamma$, the entire noise-filtered image is subjected to contrast processing to obtain a final enhanced image.

The present invention is not limited to the above optional embodiments, and those skilled in the art may derive other products in various forms under the enlightenment of the present invention. However, regardless of any changes in the shape or structure, any technical solutions falling within the scope of the claims of the present invention should fall within the protection scope of the present invention.

What is claimed is:

1. A method for enhancing a contour of an object in a real-time video image, comprising the following steps:
   S1: acquiring a captured video, and dividing a next frame of image in the video into a plurality of image blocks;
   S2: subjecting each pixel in each of the plurality of image blocks to contour enhancement based on a gradient algorithm;
   S3: subjecting the plurality of contour-enhanced image blocks as a whole to noise filtering by using a Gaussian filtering method to obtain an entire noise-filtered image; and
   S4: subjecting the entire noise-filtered image to contrast processing based on a gamma transformation to obtain a final enhanced image;
   wherein step S2 comprises:
   S2.1: performing gradient calculation on a brightness component of each pixel of each of the plurality of image blocks based on an improved gradient calculation formula to obtain a gradient value of each pixel; and
   S2.2: determining whether each gradient value is greater than a set threshold; if yes, determining that the pixel is at an edge, and determining whether to set the pixel at a white edge or a black edge according to a negative of the gradient value; and if not, not processing;
   wherein in step S2.1, the improved gradient calculation formula is:

I=$\Sigma_i\Sigma_j$((Y1−Y2)/(Y1+Y2))

wherein, Y1 and Y2 are brightness of two adjacent pixels; i and j are an abscissa and an ordinate of a pixel, respectively; and I is a calculated gradient value.

2. The method for enhancing the contour of the object in the real-time video image according to claim 1, wherein step S1 comprises: dividing the next frame of image in the video into the plurality of image blocks based on a scheme of 8×8, 16×16 or 32×32.

3. The method for enhancing the contour of the object in the real-time video image according to claim 1, wherein step S3 comprises:
- S3.1: classifying the plurality of contour-enhanced image blocks as a whole according to brightness of the plurality of contour-enhanced image blocks; and
- S3.2: if a gain value of an entire image meets a brightness requirement after classification, filtering the entire image based on a Gaussian filtering formula; and if not, not filtering.

4. The method for enhancing the contour of the object in the real-time video image according to claim 3, wherein step 3.1 comprises: subjecting the plurality of contour-enhanced image blocks to a weighted average, calculating a brightness value of the entire image, and classifying the entire contour-enhanced image according to a brightness indicated by the brightness value, that is, classifying the entire contour-enhanced image into four levels according to a gain value, namely, a level corresponding to a gain value less than ISO100, a level corresponding to a gain value of ISO200, a level corresponding to a gain value of ISO400 and a level corresponding to a gain value of ISO800.

5. The method for enhancing the contour of the object in the real-time video image according to claim 3, wherein step 3.2 comprises: not filtering when the gain value is less than ISO100; setting a standard deviation to 16 and filtering based on the Gaussian filtering formula when the gain value is ISO200; setting the standard deviation to 20 and filtering based on the Gaussian filtering formula when the gain value is ISO400; and setting the standard deviation to 25 and filtering based on the Gaussian filtering formula when the gain value is ISO800;

wherein, the Gaussian filtering formula is:

$$G(Y) = \sum_i \sum_j \frac{1}{\sqrt{2\pi}\,\sigma} e^{-\frac{Y(i,j)^2}{2\sigma^2}}$$

wherein, σ represents the standard deviation; Y represents a brightness of a current pixel;

and i and j are an abscissa and an ordinate of the pixel, respectively.

6. The method for enhancing the contour of the object in the real-time video image according to claim 5, wherein in step S4, a formula for the gamma transformation is:

$$T(Y) = \sum_i \sum_j (1 + Y)^\gamma$$

wherein, Y represents the brightness of the current pixel; γ represents a γ coefficient; and i and j are an abscissa and an ordinate of the pixel, respectively;

wherein a parameter value γ for global observation of the image and a parameter value γ for detail observation of the image are set based on the formula for the gamma transformation, and the entire noise-filtered image is respectively subjected to contrast processing through the two parameter values γ to obtain the final enhanced image T(Y).

7. The method for enhancing the contour of the object in the real-time video image according to claim 1, wherein in step S4, a formula for the gamma transformation is:

$$T(Y) = \sum_i \sum_j (1 + Y)^\gamma$$

wherein, Y represents a brightness of a current pixel; γ represents a γ coefficient; and i and j are an abscissa and an ordinate of the pixel, respectively;

wherein a parameter value γ for global observation of the image and a parameter value γ for detail observation of the image are set based on the formula for the gamma transformation, and the entire noise-filtered image is respectively subjected to contrast processing through the two parameter values γ to obtain the final enhanced image T(Y).

\* \* \* \* \*